2,887,455

PROCESS FOR THE MANUFACTURE OF ALUMINA SUPPORTS FOR CATALYSTS AND OF SUCH CATALYSTS

Edward B. Cornelius, Swarthmore, Pa., and Francis William Kirsch, Newport, Del., assignors to Houdry Process Corporation, Wilmington, Del., a corporation of Delaware No Drawing. Application May 18, 1955
Serial No. 509,412

3 Claims. (Cl. 252—466)

The invention relates to the production of catalysts to be employed in treating hydrocarbons and more particularly of such catalysts which are supported on alumina carriers. Still more particularly the invention relates to the production of alumina supports or carriers for the catalysts to be used in reforming and otherwise treating naphthas, such as straight-run naphthas, in the presence of free hydrogen. Catalysts particularly useful for this purpose have a dual- or poly-function; i.e., they have the ability of hydrogenating and dehydrogenating, isomerizing and dehydroisomerizing, hydrocracking and performing dehydrocyclization of hydrocarbons. For the combined carrying out of such reactions in reforming naphthas, the catalysts employed consist of preparations of one or more of the noble metals of group VIII of the periodic table, particularly platinum and palladium, deposited on a catalytically active alumina support. The noble metal part of the catalyst primarily has dehydrogenating activity, while the active alumina support, in conjunction with acid added with the solution of the noble metal compound or separately, will exert an isomerizing effect.

The present invention, therefore, is mainly concerned with the preparation of alumina supports of catalysts, generally, and specifically with that of such alumina supports which have improved acidic properties. It is also concerned with the preparation of dual-function catalysts comprising one or more of the metals of the platinum group on suitable alumina support having the improved acidic properties. For this purpose the alumina support is to be prepared or treated in such a manner that when it is combined with the noble metal compound there will be present during its use as catalyst an appropriate and controlled acidity. This combination may be effected, for example, by impregnating the alumina with chloroplatinic acid or chloropalladic acid solution and depositing said noble metals on the support. Any other aqueous solution of a water-soluble noble metal compound of the group VIII metals may be used with subsequent deposition of these metals or metal compound on the support combined with an additional treatment by acids or the like if required. Such additional said treatment, if employed, may precede or follow the impregnation, or may be carried out simultaneously therewith.

The alumina supports may be prepared for the purpose of the present invention from natural aluminum oxide or from a precipitation as obtained from an aluminum salt solution with the aid of an alkaline solution or the like and further treatment of this precipitation, or by treating alumina trihydrate with nitric acid or with aluminum nitrate and subsequent extrusion and calcination, for example, in accordance with the copending application Serial No. 477,596 filed on December 24, 1954, and now abandoned. By the last named process a particularly hard alumina material is obtained which is advantageous in the production of reforming catalysts resistant to mechanical wear and disintegration.

It has been proposed (e.g. Tamele et al. 2,454,724) to prepare active catalyst supports for dual-function catalysts and the like from alumina by preliminarily acid leaching alumina, in order to remove alkali metal compounds present, particularly sodium compounds, thereafter dehydrating the material, calcining it, and finally subjecting it to a steaming operation at a temperature of about 1250° F. to 1600° F. for surface area adjustment, i.e., for reducing the surface area of the support to a desirable degree. It has, however, been found that the acid function activity of a dual-function catalyst (which will suitably be shaped before calcination by extruding, pelleting, or otherwise) was insufficient if its alumina support was prepared in the above-described manner.

It is a main object of the present invention to prepare an alumina support which is capable of having a desired acid activity when combined with platinum or the like in the formation of a dual-function catalyst.

It is another object of the invention to prepare catalysts, and particularly dual-function catalysts, using such alumina carriers or supports.

Other objects and advantages of the invention will appear from the following specification and the annexed claims.

It has been discovered that it is possible to obtain a catalytically active alumina preparation which is very useful, particularly for the manufacture of a dual-function catalyst by treating an alumina preparation with removable acid after preceding calcination and surface area adjustment by steaming. The active property of an alumina support treated in this manner is in contrast to the properties of a support which has been leached by acids only before calcination and steaming in the known manner. In the latter case the ability to provide the desired amount of acid function imparted to the alumina by such acid leaching is apparently lost, at least to a substantial part, by subsequent steaming and heat treatment.

The reason for the favorable activating effect of the after-treatment of calcined and steam treated alumina with acids is not perfectly understood. It, however, may be that a peptizing effect is caused by the acid treatment apart from the removal of alkaline ingredients from the alumina. While the latter effect may also be obtained by a pretreatment of alumina with suitable acids, it appears that the peptizing or other activating effect of such pretreatment is lost again entirely or in part by a subsequent calcination and/or steam treatment.

Thus, it is a main feature of the present invention to treat alumina by acid after calcination and surface area adjustment by steaming, and it is another feature of this invention to make use of such a treatment in the manufacture of polyfunctional catalysts, particularly such which employ hard alumina.

The acid treatment after calcination and steaming of the alumina may serve the twofold purpose of removing the main portion of sodium and/or other alkali metal compounds therefrom by leaching and of activating the preparation, or it may preponderately serve only the last named purpose. In the latter case, the removal of all or most of the alkali metal compounds may be effected by leaching the alumina with suitable acid solutions before calcination and steaming. In this case, acid treatments will thus be carried out before and after calcination and steam treatment of the alumina. If the after-treatment with acid is sufficient to remove the alkali metal compounds entirely or at least to a degree such that traces thereof which may still remain in the alumina material are practically harmless, the pretreatment of the alumina by acid leaching before calcination and steam treatment may be omitted.

The acid leaching before calcination and steaming of the alumina for removal of alkali metal compounds contained therein, entirely or in part, has to be done by dilute acid solutions. This will, however, not be indispensable for the after-treatment with acids for the increase of the catalytic activity of the alumina. In this case, the use of acid vapors or gases, such as gaseous hydrochloric acid, appears possible, too.

The acids which are useful for the after-treatment of steam treated alumina in accordance with the present invention are those which may easily be removed after said treatment and without substantially damaging the alumina preparation and disadvantageously changing its properties. Mainly, these are such acids which can easily be removed by water washing and/or are easily volatilized and which either do not chemically attack alumina or form alumina compounds which, if formed, will easily be decomposed again by a drying treatment under moderate temperature conditions. Useful acid solutions are those which have an initial ionization constant (K) equal to or greater than $10^{-5}$.

Preferentially, the water soluble organic low molecular weight carboxylic acids, such as acetic acid and formic acid, are useful as well for said activating after-treatment as they are for a leaching pretreatment if such treatment is still desired. Certain inorganic acids, particularly hydrochloric acid may, however, also be used in suitable dilution. Aqueous solutions of acetic acid and formic acid of about 2% to 10% acid content are most advantageous.

After the activating treatment of the alumina preparation with the acid solution, the alumina particles are drained and repeatedly rinsed in water to substantially remove free acid still present, whereupon the particles are dried.

For producing a catalytically active alumina catalyst support in accordance with the present invention, one may thus proceed about as follows:

An alumina preparation shaped by pelleting, extruding or otherwise is subjected to a treatment with dry air at a temperature of about 1300° F. for at least one hour to calcine the material. Thereupon, the shaped calcined material is treated with 100% steam for 2 to 12 hours at a temperature of 1250–1600° F., whereby the surface area of the alumina particles may be adjusted, say, from about 180 m.²/g. down to about 80 m.²/g. The resulting material is then treated in accordance with the present invention with a 2% to 10% aqueous solution of acetic or formic acid by dipping the pellets or the like of the treated alumina in such a solution for a prolonged period of time, followed by draining, then repeatedly rinsing the pellets or the like with water to remove substantially all of the organic acid and thereafter drying the washed material. The resulting shaped material may then still be treated, if so desired, with dry air at about 1050° F. It should be noted that temperatures up to about 1050° F. and somewhat higher have no particularly detrimental effect on the desired properties of the thus treated alumina; however, temperatures in excess of about 1100° F. tend to have an increasingly detrimental effect and are to be avoided.

If it is desired for the removal of sodium or other alkali metal compounds to subject the alumina also to a leaching with acid before the surface area adjustment by steam treatment, this may be done in a known manner by subjecting the alumina particles after their calcination to a treatment with a dilute acetic or formic acid solution in a manner corresponding to the above-described after-treatment, followed by draining and rinsing, whereupon the pellets or the like are dried and then subjected to the calcining, steaming, and acid after-treatment as described before.

The active alumina particles with improved capacity to associate with a desired amount of acid are useful for the preparation of various types of supported catalysts, particularly for dual-function catalysts. For the latter purpose the treated alumina particles are impregnated and further treated in known manner with a hydrogenation-dehydrogenation catalytic component, e.g., with a chloroplatinic acid solution or with a solution of diammino dinitrito platinum $[Pt(NH_3)_2(NO_2)_2]$. The concentration of the noble metal compound solution may be such that the finished dual-function catalyst will contain about 0.1% to 1% of the noble metal.

*Example*

A hard alumina preparation, obtained by treating alumina trihydrate with aluminum nitrate and shaped by extrusion, was air dried and then calcined by treatment with bone-dry air at a temperature of about 1300° F. for about one hour. The calcined material was leached with aqueous acetic acid of about 10% content to dissolve sodium compounds present which were then removed by washing with distilled water. The washed particles were dried and subjected to a treatment with 100% steam at a temperature of about 1350° F. for 4 hours. The resulting steamed alumina particles after cooling were dipped twice in about 10% aqueous acetic acid solution for about one hour each, drained and rinsed several times with distilled water. After drying for about 2 hours at about 220° F., the particles were treated for 2 hours with bone-dry air at about 1050° F. and cooled. The pellets were then impregnated with a chloroplatinic acid solution of a concentration such as to obtain upon drying and heat treating a platinum content of about 0.5%. The catalyst thus obtained is resistant to mechanical disintegration and pulverization, and no substantial loss of platinum by such disintegration of the supporting alumina pellets will take place.

The effect of the after-treatment by acids of an alumina support for platinum-alumina catalysts in reforming treatment of naphtha is shown by the following table. In this table the results obtained with the use of such a catalyst (B) are drawn in comparison with the results obtained with a catalyst (A). The preparation of the latter differed from that of the first-named catalyst (B) only in that the second or after-treatment of the alumina particles with acid was omitted and acid treatment was carried out only before calcination and surface area adjustment.

For this comparison heavy East Texas naphtha was subjected under otherwise identical conditions in runs of about 20 hours to treatment in the presence of the one and of the other of both these catalysts, (A) and (B), respectively. The alumina supports of both catalysts (A) and (B) had a surface area of 82 m.²/g. and a content of 0.09% of sodium oxide, and both catalysts contained 0.5% platinum obtained by impregnation of the support with $H_2PtCl_6$. A pressure of 600 pounds per square inch gauge, a liquid hourly space velocity of 4 and a molar proportion of added hydrogen to charge oil of 6 were employed in both cases at the temperatures named in the table.

| | Catalyst (A) | | | | Catalyst (B) | | | |
|---|---|---|---|---|---|---|---|---|
| Temperature, °F | 900 | 925 | 950 | 975 | 900 | 925 | 950 | 975 |
| Octane Number | 66.2 | 71.3 | 82.5 | 87.6 | 79.8 | 86.3 | 91.0 | 96.2 |
| Aromatics, Volume Percent Liquid Prods. | 43 | 48 | 54 | ------ | 45 | 50 | 55 | 69 |

The comparative table shows a percental increase of aromatics in the product and a marked increase in the octane number of the gasolines produced with the use of the catalyst (B) obtained in accordance with the present invention.

Obviously many modifications and variations of the invention as hereinbefore set forth may be made without departing from the spirit and scope thereof, and therefore only such limitations should be imposed as are indicated in the appended claims.

We claim:
1. A process for preparing a catalyst useful in the catalytic treatment of hydrocarbons and the like, particularly in reforming naphtha, comprising treating pelleted alumina with dry air at a temperature of about 1300° F. for at least one hour, treating said previously heated alumina with steam at a temperature in the range of 1250° F. to 1600° F. for 2 to 12 hours, and subsequently treating the resulting product with an aqueous solution of about 2% to 10% strength of a water soluble lower carboxylic acid of the group consisting of acetic acid and formic acid for at least one hour, draining said acid solution, water washing the treated alumina material, and drying the same at a temperature not in excess of 1050° F., and thereafter impregnating the dried support with an acidic solution of a compound of at least one of the noble metals of group VIII of the periodic table thereby depositing such noble metal compound on said alumina support, and drying the resulting catalyst.

2. In a process in accordance with claim 1, treating the alumina after air drying but before steam treatment with a solution of water soluble lower carboxylic acid of the group consisting of acetic acid and formic acid.

3. A process for preparing an active catalyst useful in the catalytic treatment of hydrocarbons and the like, particularly in reforming naphtha, comprising treating shaped alumina granules by calcination with dry air at a temperature of about 1300° F. for at least one hour, treating said calcined alumina granules with 100% steam at a temperature of about 1350° F. for about 4 hours, and subsequently dipping the steamed alumina granules repeatedly in an aqueous acetic acid solution of about 10% strength for at least one hour each, draining said treated granules, rinsing them repeatedly in water, and drying them at a temperature not in excess of 1050° F., impregnating the dried granules with aqueous chloroplatinic acid, and drying the impregnated granules.

References Cited in the file of this patent

UNITED STATES PATENTS

| | | |
|---|---|---|
| 2,404,024 | Baillie et al. | July 16, 1946 |
| 2,454,724 | Tamele et al. | Nov. 23, 1948 |
| 2,499,675 | Owen | Mar. 7, 1950 |
| 2,507,864 | Moore et al. | May 16, 1950 |
| 2,582,428 | Haensel | Jan. 15, 1952 |
| 2,611,749 | Haensel | Sept. 23, 1952 |
| 2,651,617 | Schmerling | Sept. 8, 1953 |
| 2,767,148 | Plank | Oct. 16, 1956 |